(12) United States Patent
Watanabe et al.

(10) Patent No.: US 7,042,584 B1
(45) Date of Patent: May 9, 2006

(54) COMPLEX IMAGE PROCESSING APPARATUS

(75) Inventors: Kimiko Watanabe, Yamatokoriyama (JP); Naoyuki Kamei, Nara (JP); Fumikazu Nagano, Higashihiroshima (JP); Yoshinori Hayashi, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 830 days.

(21) Appl. No.: 09/662,501

(22) Filed: Sep. 14, 2000

(30) Foreign Application Priority Data

Sep. 14, 1999 (JP) ............................... P11-260564

(51) Int. Cl.
G06K 15/00 (2006.01)
(52) U.S. Cl. ..................... 358/1.15; 358/468; 358/404; 358/444
(58) Field of Classification Search ............... 358/1.16, 358/1.15, 468, 400, 500, 1.13, 1.12, 401, 358/442, 444, 520; 382/162, 167
See application file for complete search history.

(56) References Cited

U.S. PATENT DOCUMENTS

| 5,163,089 | A | * | 11/1992 | Kotani et al. | 379/100.02 |
| 5,854,693 | A | * | 12/1998 | Yoshiura et al. | 358/468 |
| 5,886,793 | A |   | 3/1999  | Satou | 358/404 |
| 5,898,824 | A | * | 4/1999  | Kato et al. | 358/1.16 |
| 6,055,067 | A |   | 4/2000  | Matsuda et al. | 358/468 |
| 6,519,057 | B1| * | 2/2003  | Kurosawa et al. | 358/468 |
| 2003/0137694 | A1 | * | 7/2003 | Tomidokoro | 358/1.15 |

FOREIGN PATENT DOCUMENTS

| EP | 0643526 | * | 3/1995 |
| JP | 02-082756 |   | 3/1990 |
| JP | 05-103173 |   | 4/1993 |
| JP | 08-279887 |   | 10/1996 |
| JP | 09-172529 |   | 6/1997 |
| JP | 10-243175 |   | 11/1998 |
| JP | 11-146106 | * | 5/1999 |
| JP | 2004-274499 | * | 9/2004 |

OTHER PUBLICATIONS

Office Action for corresponding Japanese Patent Application No. 11-260564, dated Oct. 5, 2004.
Decision of Refusal for corresponding Japanese Patent Application No. 11-260564, mailed Feb. 8, 2005.

* cited by examiner

Primary Examiner—Jerome Grant
(74) Attorney, Agent, or Firm—Renner, Otto, Boisselle & Sklar, LLP (57) ABSTRACT

It is an object of the invention to allow effective use of a memory provided for each function in a complex image processing apparatus including a facsimile apparatus, to increase the reception capacity of a memory reception function when the apparatus works as a facsimile apparatus and to enable sorting of received facsimile data. In the complex image processing apparatus, facsimile data received via a modem section is accumulated in a memory for facsimile. Under predetermined conditions, the facsimile data in the memory for facsimile are grouped, rearranged and transferred to a memory for copier and a memory for printer. Conditions for causing data rearrangement and transfer may be set such that they occur when a predetermined time passes after the beginning of the operation of the memory reception function or such that they occur when the remaining capacity of the memory for facsimile comes to a predetermined capacity. Grouping can be carried out based on the telephone numbers of senders and the like during rearrangement of facsimile data.

11 Claims, 9 Drawing Sheets

COMPLEX IMAGE PROCESSING APPARATUS

BACKGROUND OF THE INVENTION

1. Field of the Invention

The present invention relates to a complex image processing apparatus which can function as a facsimile apparatus and another kind of apparatus.

2. Description of the Related Art

Complex image processing apparatuses have been used which can function not only as facsimile apparatuses but also as printers or copiers utilizing image forming means for forming an image on a recording medium such as recording paper of the facsimile apparatus and as copiers or scanners utilizing image input means of the facsimile apparatus.

A facsimile apparatus which functions purely and simply as a facsimile apparatus has memory reception and memory transmission functions. The memory transmission function is to temporarily store a read document in a memory and to transmit the same. The memory reception function is to store received image information in a memory and to print the same later. A copier which functions purely and simply as a copying machine has functions such as storing read images in a memory temporarily and copying, for example, one sheet of document on a plurality of sheets by reading images on the document only once. A printer has a function of temporarily storing image data for forming an image in a memory as an input buffer.

Also in a complex image processing apparatus, the same as in a facsimile apparatus, a copier and a printer each of which functions purely and simply as such, each function of the complex image processing apparatus can be effectively utilized using a memory independently for each function. Especially, in the case of a facsimile apparatus having a so-called memory reception function, since received image data can be accumulated in a memory and can be collectively output after a predetermined period, it is possible to avoid output in occasions when the user is absent at night or on vacation and therefore prevent output documents from being lost or stolen.

Memories in conventional complex image processing apparatuses operate independently to serve respective functions. A memory for copier is used for memory printing in a function as a copier. A memory for facsimile is used for memory transmission and memory reception. Further, a memory for printer is used only for storing image information based on a request for printing from a computer or the like on a network to which the printer is connected. According to such methods for using memories, however, a plurality of memories are required to allow each function to be satisfactorily performed, and the capacity of each of the memories must be increased in order to improve the processing capability. In order to process image information whose volume exceeds the capacity of a memory, control must be carried out such that the relevant operation is carried out within the capacity of the memory, for example, as in Japanese Unexamined Patent Publication JP-A 10-243175 (1998) which discloses a method for use of a memory in a copier.

Even in an image processing apparatus having a complex function, the capacity of a memory for memory reception function is preferably as large as possible just as in a facsimile apparatus which functions purely and simply as an facsimile apparatus. However, since a conventional memory reception function outputs received image information in the order of reception, a user must re-sort output documents when the output documents are to be classified based on senders or when it is desired to check the presence of an important urgent document, although the conventional mode of output allows the order of reception to be understood. Such burdens to a user are significantly increased especially when the memory capacity is increased to output a large volume of data at a time.

Further, it is absolutely impossible to receive data whose volume exceeds the storage capacity of a memory if the principle of accepting data within the storage capacity of the memory is simply applied to the memory reception function of a facsimile apparatus as in the related art including that in JP-A 10-243175.

SUMMARY

It is an object of the invention to provide a complex image processing apparatus in which the capacity of memory reception which allows the apparatus to be utilized as a facsimile apparatus can be increased without increasing the memory capacity of the apparatus as a whole.

It is another object of the invention to provide a complex image processing apparatus capable of forming images on a recording medium in a pre-sorted state from a plurality of items of image information received using a memory reception function.

The invention provides a complex image processing apparatus capable of operating as a facsimile apparatus, comprising:

image reading means for reading image information of a document;

image communicating means for transmitting the image information read by the image reading means and receiving image information;

image forming means for recording the image information received by the image communicating means on a recording medium;

mode switching means for carrying out switching among facsimile mode and other modes, the complex image processing apparatus being used in the facsimile mode, as a facsimile apparatus in which a memory reception function can be specified, and in the other modes, as other kinds of apparatuses;

a memory for facsimile available only in the facsimile mode;

a memory for other modes available in the other modes; and memory control means for performing control in the facsimile mode such that image information stored in the memory for facsimile is transferred to either or both of the memories for the other modes in the case where predetermined conditions are satisfied.

According to the invention, the complex image processing apparatus is capable of operating as a facsimile apparatus, and comprises image reading means for reading image information of a document, image communicating means for transmitting the image information read by the image reading means and receiving image information, and image forming means for recording the image information received by the image communicating means on a recording medium, and further comprises mode switching means, a memory for facsimile, memories for other modes and memory control means. The mode switching means carries out switching among facsimile mode and other modes, and the complex image processing apparatus is used in the facsimile mode, as a facsimile apparatus in which a memory reception function can be specified, and in the other modes, as other kinds of apparatuses. The memory for facsimile is available only in the facsimile mode, and the memories for other modes are available in the other modes. The memory control means performs control in the facsimile mode such that image information stored in the memory for facsimile is transferred to either or both of the memories for the other modes in the case where predetermined conditions are satisfied.

As a result, the memories for the other modes can be used in the facsimile mode in addition to the memory for facsimile when the predetermined conditions are satisfied, which makes it possible to effectively use the memories of the complex image processing apparatus for facsimile function as a whole. Therefore, even if the memory for facsimile has a small capacity, it is possible to prevent the occurrence of a busy state due to the lack of memory capacity for facsimile function, by transferring image information for the facsimile function to the memories for the other modes.

As described above, according to the invention, since the capacity of the memory to enable use of the apparatus as a facsimile apparatus in the facsimile mode can be increased by the addition of the memories for the other modes, the memories of the composite image forming apparatus as a whole can be effectively used to enable it to operate as a facsimile apparatus substantially utilizing a memory of large capacity.

In the invention it is preferable that the predetermined conditions are that the memory reception function is specified in the facsimile mode and a predetermined time has passed after beginning of memory reception.

According to the invention, since the memory control means stores image information in the memories for the other modes when the memory reception function is specified in the facsimile mode and the predetermined time has passed after the beginning of memory reception, it is possible to increase a memory capacity that can be used for memory reception, thereby allowing reception of a large volume of image information. Further, since a memory for storing received image information is the memory for facsimile within the predetermined time and the memories for the other modes when the predetermined time has passed, the received image information can be divided based on elapsed time.

In the invention it is preferable that the predetermined conditions are that the memory reception function is specified in the facsimile mode and a remaining capacity of the memory for facsimile after beginning of memory reception, available in the memory reception function, comes to a predetermined capacity.

According to the invention, when the remaining capacity of the memory for facsimile comes to the predetermined capacity in the facsimile mode, received image information is transferred to the memories for the other modes. Accordingly even where the volume of reception data exceeds the remaining capacity of the memory for facsimile, the overflow of the data is prevented from failing to be stored. As described above, according to the invention, since received image information can be transferred to the memories for the other modes when only a small capacity is left in the memory for facsimile in the memory reception mode of the apparatus, the memories for the other modes can be effectively used to increase facsimile data reception capacity.

In the invention it is preferable that the predetermined capacity is set to a capacity for use in storing a largest volume of image information among per-communication reception volumes of image information in a reception history of the facsimile mode.

According to the invention, since the predetermined capacity that triggers storage of received image information into the memories for the other modes is set such that the capacity for use in storing the largest volume of image information among per-communication reception volumes of image information in the reception history of the facsimile mode is left, the memory for facsimile can be kept in a state in which the capacity for use in storing the largest volume of image information is left to increase reception data. As described above, according to the invention, by transferring image information from the memory for facsimile to the memories for the other functions in the memory reception mode to enable the use of the apparatus as a facsimile apparatus, a vacant capacity for use in storing the largest volume of image information among per-communication reception volumes of image information in the reception history of the facsimile mode is left in the memory for facsimile, which makes it possible to receive data in a volume equal to or smaller than the largest volume of image information any time, thereby increasing reception data.

In the invention it is preferable that the memory control means performs control such that image information transferred to the memories for the other modes is rearranged according to predetermined criteria.

According to the invention, since image information transferred to the memories for the other modes is rearranged according to predetermined criteria, data received in the memory reception function can be stored in the memories for the other modes after being sorted based on, for example, the telephone numbers of the senders instead of simply storing the image information as it is received. As described above, according to the invention, image information received in the memory reception function is transferred to the memories for the other modes in a rearranged form, the image information can be read from the memories for the other modes in a pre-sorted state.

In the invention it is preferable that the memory control means performs control such that the rearranged image information is sequentially transferred in the order of decreasing data sizes insofar as the rearranged image information can be stored in the memories for the other modes.

According to the invention, since the rearranged image information is sequentially transferred in the order of decreasing data sizes insofar as the rearranged image information can be stored in the memories for the other modes, the memories of the complex image processing apparatus can be effectively used. As described above, according to the invention, data rearranged in the order of their decreasing sizes can be read from the memories for the other modes, the memories of the complex image processing apparatus as a whole can be effectively used.

In the invention it is preferable that the memory control means makes a data format of image information transferred to the memories for the other modes, identical to a data format of image information stored in the memory for facsimile.

According to the invention, when image information received in the memory reception function of the apparatus as a facsimile apparatus is transferred to the memories for the other modes, the image information is stored in the data format identical to the data format of image information stored in the memory for facsimile, which makes it possible to store image information in the memories for the other modes using a data format for facsimile communication on which a compression process is generally carried out to eliminate a need for a specified decompression process on the image information associated with the memories for the other modes and to store a large volume of image information in the memories for the other modes. As described above, according to the invention, there is no need for a process for converting a data format, and the memories for the other modes can be used similarly to the memory for facsimile.

In the invention it is preferable that in the case where received image information is stored in the memory for facsimile and in either or both of the memories for the other modes, the memory control means performs control such that the image forming means records image information stored in the memories for the other modes, on a recording medium prior to recording the image information stored in the memory for facsimile on a recording medium.

According to the invention, since control is carried out such that in the case where image information received in the memory reception function of the apparatus as a facsimile apparatus is stored in the memory for facsimile and the memories for the other modes, the image recording means records the image information transferred to the memories for the other modes on to a recording medium, prior to recording image information stored in the memory for facsimile on a recording medium. This makes it possible to return the memories for the other modes to a vacant state quickly, thereby promoting recovery of other functions in which the memories are utilized, such as a copier or printer.

In the invention it is preferable that in the case where received image information is stored in the memory for facsimile and in either or both of the memories for the other modes, the memory control means performs control such that the image forming means records image information stored in the memory for facsimile on a recording medium, prior to recording the image information stored in the memories for the other modes on a recording medium.

According to the invention, since control is carried out such that in the case where image information received in the memory reception function of the apparatus as a facsimile apparatus is stored in the memory for facsimile and the memories for the other modes, the image recording means records the image information stored in the memory for facsimile on a recording medium prior to recording the image information stored in the memories for the other functions on a recording medium, the memory for facsimile can be quickly returned to a vacant state, and the next image information can be received even if the next image information has a large data size. As described above, according to the invention, the memory for facsimile can be returned to a vacant state, which allows the memory reception function of the apparatus as a facsimile apparatus to be recovered quickly to make possible reception of the next data.

In the invention it is preferable that in the case where received image information is stored in the memory for facsimile and in either or both of the memories for the other modes, the memory control means performs control such that the image forming means records the image information on a recording medium in the order of decreasing data sizes starting with a piece of image information having a largest data size.

According to the invention, since image information stored in the memory for facsimile and the memories for the other modes in the memory reception function of the apparatus as a facsimile apparatus is recorded on a recording medium by the image forming means in the order of decreasing data sizes, a large vacant capacity is provided after the image information is recorded on the recording medium, to allow functions in the other modes to be recovered quickly.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to the drawings, preferred embodiments of the invention are described below.

Figure 1:
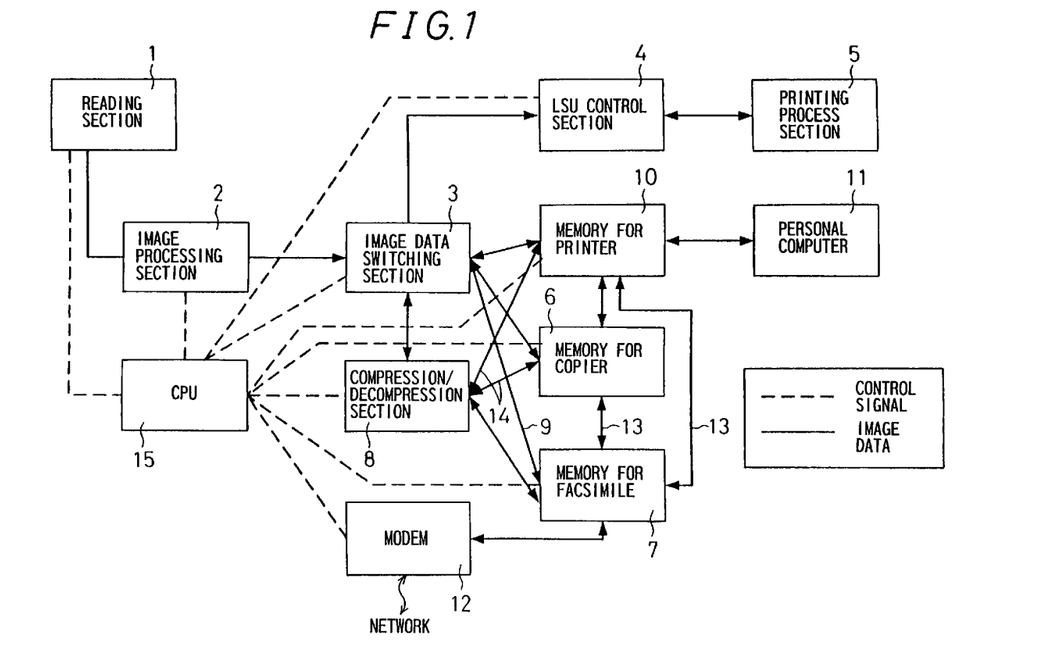
FIG. 1 is a block diagram showing a schematic system configuration of a complex image processing apparatus of an embodiment of the invention.

FIG. 1 shows a schematic system configuration of a complex image processing apparatus of an embodiment of the invention. The complex image processing apparatus of the embodiment of the invention can be switched for operations in a facsimile mode as a facsimile apparatus, a copier mode as a copier and a printer mode as a printer. In the normal copier mode, image data read by a reading section 1 are subjected to a predetermined image process at an image processing section 2 and are supplied from an image data switching section 3 to a printing process section 5 via a laser scan unit (hereinafter abbreviated as "LSU") control section 4 to be recorded on recording paper as a recording medium by means of printing or the like. The image reading at the reading section 1 is carried out in cooperation with a printing process at the printing process section 5.

In the copier mode of the complex image processing apparatus as shown in FIG. 1, an operation in a memory copier mode utilizing a memory function is also enable. In the memory copier mode, image data read by the image reading section 1 are subjected to image processing at the image processing section 2 and are thereafter temporarily stored from the image data switching section 3 into a memory for copier 6. The image data stored in the memory for copier 6 are sequentially read in accordance with the printing speed of the printing process section 5 and are supplied from the data switching section 3 via the LSU control section 4 to the printing process section 5. The reading section 1 may read image data in precedence to the printing process at the printing process section 5 independently of the same to improve the reading speed. When the memory for copier 6 becomes full in such a memory copier mode, image data read by the reading section 1 are accumulated in a memory for another mode provided in the complex image processing apparatus, e.g., a memory for facsimile 7.

Image data read by the reading section 1 are subjected to a predetermined compression process to compress the data volume instead of being directly supplied as image data to be transmitted in the facsimile mode. Since image data received in the facsimile mode have been subjected to the compression process, a decompression process which works the reverse direction of the compression process must be carried out to print the data at the printing process section 5. A compression/decompression section 8 is provided for this purpose. When priority in recording of image data in the memory for facsimile 7 is set to capacity, the image data switching section 3 stores image data in the memory for facsimile 7 after compressing the same at the compression/decompression section 8. This makes it possible to accumulate image data using a smaller memory capacity. On the contrary, when priority is set to image quality, image data are accumulated in the memory for facsimile 7 via a bypass line 9 for bypassing the compression/decompression section 8 to directly accumulate the data in the memory for facsimile 7 in an uncompressed state, which makes it possible to accumulate them with image quality similar to that of image data accumulated in the memory for copier 6.

In the complex image processing apparatus in FIG. 1, a memory for printer 10 is provided in addition to the memory for copier 6 and memory for facsimile 7. The memory for printer 10 can be also used in combination with the memory for copier 6 similarly to the memory for facsimile 7. In the case where priority is set to image quality, a selection can be made to use the memory for printer 10 in combination with the memory for copier 6 before using the memory for facsimile 7.

In the normal printer mode, image data transmitted by a personal computer 11 are temporarily stored in the memory for printer 10 and are supplied from the image data switching section 3 via the LSU control section 4 to the printing process section 5. The reading of image data from the personal computer 11 into the memory for printer 10 may precede the printing process at the printing process section 5 independently of the same. When the printing process is disabled for the lack of paper or another process with priority in progress, the image data supplied from the personal computer 11 are accumulated in the memory for printer 10. When the memory for printer 10 becomes full in this printer mode, the image data switching section 3 transfers data accumulated earlier in the memory for printer 10 to the memory for copier 6 or memory for facsimile 7 in an uncompressed state to clear the memory for printer 10, thereby allowing subsequent reading of data from the personal computer 11 into the memory for printer 10. Thus, the memory for printer 10 can be used in combination with the memory for copier 6 or memory for facsimile 7 in the printer mode without providing the image data switching section 3 between the personal computer 11 and the memory for printer 10. It is therefore possible to use the memory for each function effectively even in the printer mode, and image quality can be maintained because data compression at the compression/decompression section 8 is not carried out.

During transmission in the facsimile mode, image data read by the reading section 1 are subjected to image processing at the image processing section 2, are supplied from the image data switching section 3 to the compression/decompression section 8 to carry out a compression process on the same and are thereafter transmitted to a modem 12 via the memory for facsimile 7 and output to a communication line. In the case of direct transmission, image data are read by the image reading section 1 in conjunction with the transmission and output of image data. During memory transmission, the reading at the reading section 1 precedes the transmission and output to the communication line independently of the same, and image data that are a difference between the read data and the transmitted output are accumulated in the memory for facsimile 7.

During reception in the facsimile mode, facsimile data received from a communication line is supplied from the modem 12 via the memory for facsimile 7 to the compression/decompression section 8 to be subjected to a decompression process and are thereafter supplied from the image data switching section 3 to the printing process section 5 via the LSU control section 4. When the printing process at the printing process section 5 is disabled for the lack of paper or the like, the facsimile data are accumulated in the memory for facsimile 7 as they are in the compressed state. Before the memory for facsimile 7 becomes full, the facsimile data accumulated in the memory for facsimile 7 are transferred via a bypass line 13 to the memory for copier 6 or memory for printer 10 to be accumulated therein in a compressed state similar to the state of them during memory reception in the facsimile mode. When the facsimile data accumulated in the memory for copier 6 or memory for printer 10 are printed, since facsimile data in a compressed state in the memory for copier 6 and memory for printer 10 are treated in the same way as for facsimile data in the memory for facsimile 7, they are supplied via a bypass line 14 to the compression/decompression section 8 to be subjected to the decompression process and are thereafter supplied from the image data switching section 3 via the LSU control section 4 to the printing process section 5.

The complex image processing apparatus shown in FIG. 1 as a whole is controlled by a CPU 15. In the embodiment of the invention, since the memory for copier 6, memory for facsimile 7 and memory for printer 10 can be used in combination in each of the copier mode, facsimile mode and printer mode; it is possible to increase a substantial memory capacity in each mode.

Figure 2:
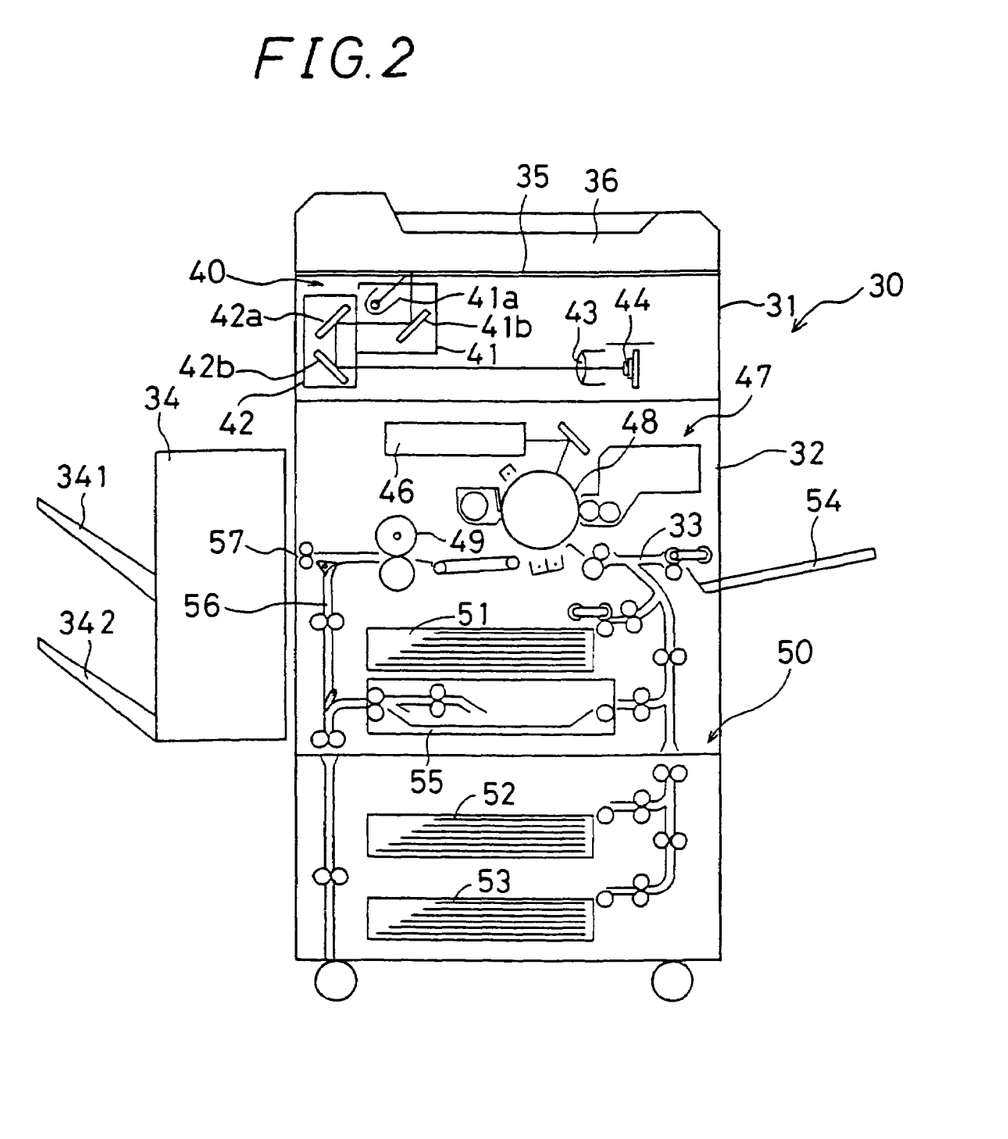
FIG. 2 is a block diagram showing a system configuration of a digital complex machine 30 of an embodiment of the complex image processing apparatus in FIG. 1.

FIG. 2 shows a configuration of a digital complex machine 30 including a facsimile apparatus as an embodiment of the complex image processing apparatus shown in FIG. 1. The digital complex machine 30 is formed by a scanner 31 corresponding to the reading section 1, a laser recording section 32 that constitutes the printing process section 5, a transport section 33, a post-processing device 34 and the like. The scanner 31 is provided as an image input device of the digital complex machine 30 for reading images of documents. The scanner 31 has a document table 35 constituted by a transparent glass and, in addition, a recirculating automatic document feeder (hereinafter abbreviated as "RADF") 36 and a scanner unit 40. The scanner 31 is set such that sheets of document are placed on the document table one after another and images of the same are sequentially read. The RADF 36 transports documents set in a predetermined document tray which is not shown one after another on to the document table 35. It has a function of transporting documents to a predetermined discharge position after images are read therefrom by the scanner unit 40. The RADF 36 can also transport the documents again to the document table 35 by turning them inside out after images are read from the documents by the scanner unit 40. Therefore, in addition to transport path for single-side reading used for reading one side of documents, the RADF 36 has a transport path for double-side reading used for reading both sides of documents, guides for switching the transport path to be used, a sensor for checking the state of documents in each of the transport paths, a control section and the like. In the scanner 31, the scanner unit 40 can read images on both sides of documents using such an RADF 36. The configuration of the RADF 36 will not be described in detail because it is well-known.

The scanner unit 40 is configured as a document image reading unit for reading an image of a document transported on to the document table 35 in each unit in the direction of a scan line. The scanner unit 40 has a first scan unit 41, a second scan unit 42, an optical lens 43 and a CCD 44. The first scan unit 41 exposes a document with light while moving along the document table 35 at a constant velocity V from left to right in the figure which is the direction of a subscan line. The first scan unit 41 has a lamp reflector assembly 41*a* for radiating light and a first reflecting mirror 41*b* for guiding light reflected by a document to the second scan unit 42. The second scan unit 42 moves at a velocity V/2 following the first scan unit 41. The second scan unit 42 has second and third reflecting mirrors 42*a* and 42*b* for guiding light from the first reflecting mirror 41*b* toward the optical lens 43 and CCD 44. The optical lens 43 forms an image of the light reflected by the third reflecting mirror 42*b* on an image pick-up surface of the CCD 44 which is a photoelectric conversion element. The CCD 44 which is an image pick-up element converts the light formed by the optical lens 43 into an electric signal. The electric signal provided by the CCD 44 is an analog signal which is in turn converted by a CCD board 300 to be described later into image data which are a digital signal. The image data are subjected to various image processes at the image processing section 2 in FIG. 1 and are thereafter stored in the memory for copier 6, memory for facsimile 7 or memory for printer 10. The image data stored in each memory are transferred to the laser recording section 32 in accordance with an output instruction from a main CPU 15.

The laser recording section 32 is provided for forming an image on recording paper based on the image data. The laser recording section 32 has an LSU 46, an electrophotographic process section 47, a photosensitive drum 48, a fixing device 49, a sheet transport section 50, etc. The LSU 46 irradiates the photosensitive drum 48 of the electrophotographic process section 47 with laser light based on image data read by the scanner 31 or image data input from the outside to form an electrostatic latent image on the photosensitive drum 48. The LSU 46 has a semiconductor laser light source, a polygon mirror for polarizing laser light at equal angular speeds and an f-θ lens. The f-θ lens corrects the laser light polarized by the polygon mirror such that it is polarized on the surface of the photosensitive drum 48 at equal angular speeds.

The electrophotographic process section 47 has the photosensitive drum 48 and a charging device, a developing device, a transfer device, a peeling device, a cleaning device and an static eliminator provided around the photosensitive drum 48. It has a function of developing an electrostatic latent image formed on the photosensitive drum 48 by the LSU 46 to form a toner image and electrostatically transferring it on to recording paper. The configuration of such an LSU 46 and electrophotographic process section 47 will not be described in detail because they are well-known.

The sheet transfer mechanism 50 has a function of supplying recording paper to the electrophotographic process section 47, fixing a transferred image on the recording paper and discharging the recording paper to the outside. In addition to the transport section 33, post-process section 34 and fixing device 49, the sheet transfer mechanism 50 has cassette paper feeding devices 51, 52 and 53, a manual paper feeding device 54, a double-side copying unit 55, a recirculating path 56 and a paper discharge roller 57. The transport section 33 transports recording paper from the cassette paper feeding devices 51 through 53, manual paper feeding device 54 or recirculating path 56 to a predetermined transfer position of the electrophotographic process section 47. The transfer device is disposed in the transfer position. The cassette paper feeding devices 51 through 53 are provided to contain recording paper for transfer and to feed the recording paper into the transport section 33 when transfer is carried out. The manual paper feeding device 54 is used to supply recording paper of a type which is not contained in the cassette paper feeding devices 51 through 53 to the transport section 33. The fixing device 49 is provided to fix a toner image transferred on to recording paper. The double-side copying unit 55 is used to recirculate recording paper to the transport section 33 after the toner image is fixed to form an image on the other side of the recording paper. The recirculating path 56 is provided to transport a sheet having an image formed thereon to the double-side copying unit 55. The paper discharge roller 57 is a transport roller for supplying recording paper discharged from the fixing device 49 to either of the post-processing device 34 and the recirculating path 56.

The post-processing device 34 is used to carry out post-processes such as a stapling process on recording paper discharged from the paper discharge roller 57. The post-processing device 34 has a first discharge tray 341 and a second discharge tray 342. In the post-processing device 34, there is provided a paper receiving port, a first transport path, a second transport path, a first switching gate, a second switching gate, a third transport path serving as an inverting path, a first discharge roller, a second discharge roller, etc. to accommodate various discharging modes. The discharging modes include a first discharging mode, a second discharging mode and a third discharging mode.

In the first discharging mode, recording paper received by the paper receiving port from the discharge roller 57 is directly discharged by the first discharge roller from the first transport path to the first discharge tray 341.

In the second discharging mode, recording paper received by the paper receiving port is guided by the first switching gate to the second transport path and is thereafter guided by the second switching gate toward the second discharge roller. It is then discharged from the second discharge roller to the second discharge tray 342.

In the third discharging mode, recording paper received by the paper receiving port is guided by the first switching gate to the second transport path and is thereafter guided by the second switching gate to the third transport path. When the rear end of the recording paper passes the second switching gate, the recording paper is transported on a switch-back manner, guided by the second switching gate to the second discharge roller and discharged from the second discharge roller to the second discharge tray 342.

Further, an offset mechanism is provided at each of the discharge trays 341 and 342. Each offset mechanism moves the discharge tray in a direction perpendicular to the direction in which recording paper is discharged. This makes it possible to contain discharged recording paper, the paper being sorted based on jobs or modes. Those offset mechanisms are also mechanisms which have been well known.

Figure 3:
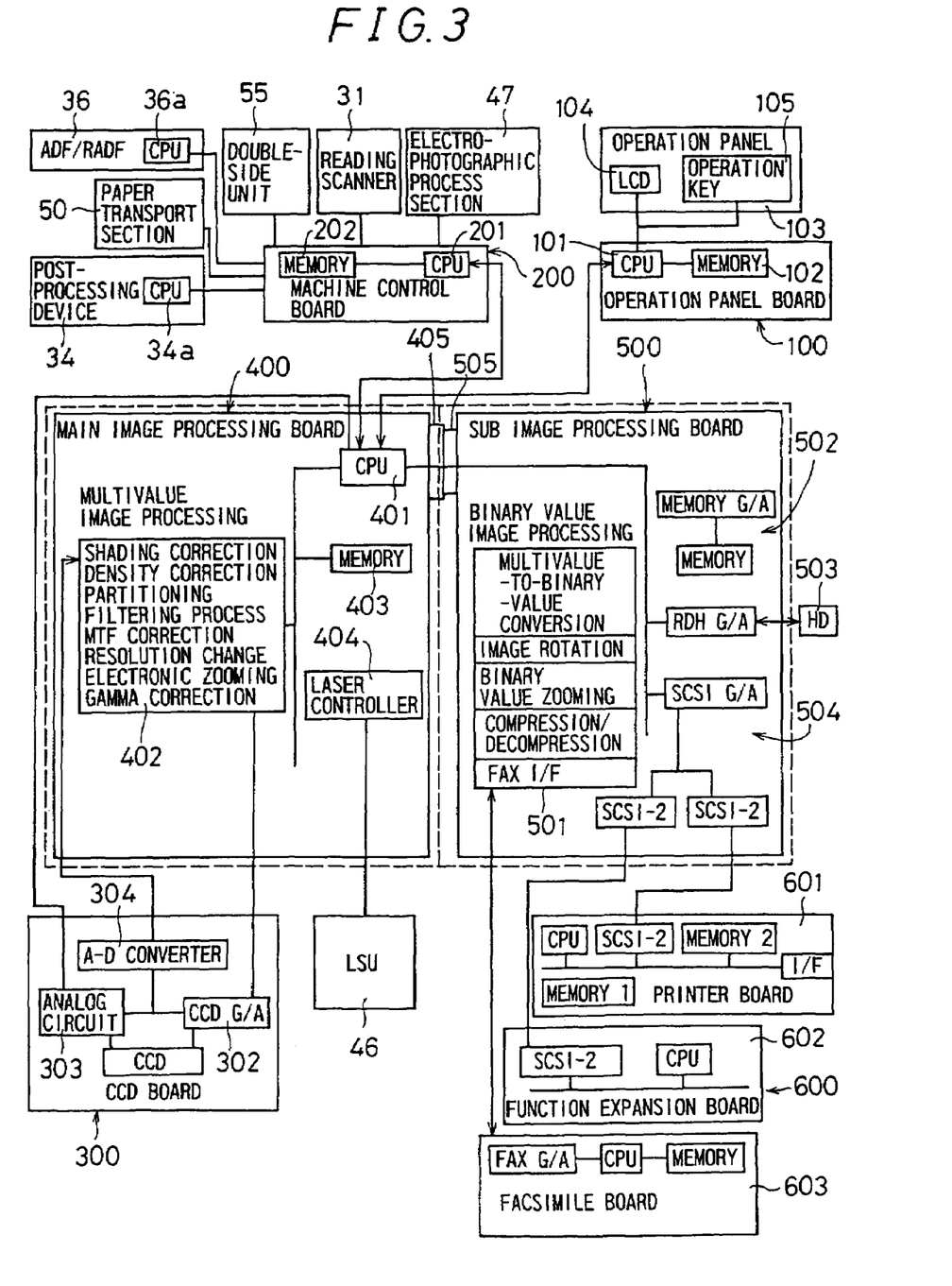
FIG. 3 is a block diagram showing an electrical configuration of the digital complex machine 30 in FIG. 2.

FIG. 3 shows a control system of the digital complex machine 30. In addition to the members shown in FIG. 2, the digital complex machine 30 has an operation panel board 100, a machine control board 200, a CCD board 300, a main image processing board 400, a sub image processing board 500 and a group of expansion boards 600 as boards that form a control system. Those boards control each member in the digital complex machine 30 and process images read by the scanner 31.

The operation panel board 100 shown in an upper right part of FIG. 3 includes a sub CPU 101, a memory 102, an operation panel 103, a liquid crystal display (hereinafter abbreviated as "LCD") display section 104, a group of operating keys 105, etc. The sub CPU 101 manages and controls the LCD display section 104 and the group of operating keys 105 provided on the operation panel 103. The memory 102 stores various control information of the operation panel board 100 from the operation panel 103 including instruction data from the group of operating keys 105 and information to be displayed on the LCD display section 104.

The machine control board 200 located in an upper left part of FIG. 3 has a sub CPU 201, a memory 202, etc. The RADF 36, scanner 31, electrophotographic process section 47, double-side copying unit 55 and post-processing device 34 shown in FIG. 2 are controlled by the sub CPU 201.

The CCD board 300 located in a lower left part of FIG. 3 has the CCD 44 shown in FIG. 2 and generates image data constituted by an electric signal based on light reflected by a document. A digital circuit 302 such as a CCD gate array is provided to drive the CCD 44, and there is also provided an analog circuit 303 for adjusting the gain of an analog output from the CCD 44, an A-D converter 304 for generating image data which is a digital signal from the analog output, etc. Each constituent part of the CCD board 300 is controlled and managed by a main CPU 401 of the main image processing board 400.

The main image processing board 400 carries out image processing on image data generated by the CCD board 300 and constitutes a major part of the image processing section 2 shown in FIG. 1. Specifically, the main image processing board 400 has the main CPU 401, a multivalue image processing section 402, a memory 403 and a laser controller 404. The main CPU 401 has a function of controlling each member of the digital complex machine 30 in cooperation with other boards, RADF 36 and the sub CPU provided in the post-processing device 34 and managing the operation of the same. The multivalue image processing section 402 carries out image processing on image data transferred from the CCD board 300 such that an image having desired tones can be formed on recording paper. Image processes carried out by the multivalue image processing section 402 are image processes on multivalue image data such as shading correction, density correction, partitioning, a filtering process, MTF correction, resolution change, electronic zooming for changing a magnification and gamma correction.

The memory 403 is provided to store various control data such as image data which have been subjected to image processing and data for managing steps of the image processing. The laser controller 404 transfers image data which have been subjected to image processing to the LSU 46. The main CPU 401 communicates control data with the sub CPU 101 of the operation panel board 100 and inputs instruction data from a user. The main CPU 401 also transfers control data indicating the state of operation of the digital complex machine 30 to the sub CPU 101. The sub CPU 101 displays the state of operation of the digital complex machine 30 on the LCD display section 104.

The sub image processing board 500 is another image processing section provided to carry out further image processes on image data which have been subjected to image processing at the main image processing board 400. The sub image processing board 500 has a binary value image processing section 501, a memory section 502, a hard disk device 503 and an interface section 504. The binary value image processing section 501 is provided to binarize image data which have been subjected to image processing at the main image processing board 400 values and carry out further image processing on the same. It has a multivalue-to-binary-value converting section for converting multivalue image data into binary value image data, an image rotating process section for rotating an image, a binary value zoom process section for carrying out a process of changing the magnification of a binary value image and a compression/decompression process section for carrying out compression and decompression processes. Further, the binary value image processing section 501 has a facsimile interface for facsimile communication. The binary value image processing section 501 is connected to the main image processing board 400 via a connector and is controlled by the main CPU 401.

The memory section 502 has a memory for storing binary value image data which have been processed by the binary value image data processing section 501, control data for image processing and the like, a gate array for controlling the memory, etc. The hard disk device 503 is provided to store a large volume of image data and is equipped with a disk memory and a gate array for controlling the disk memory. The interface section 504 has an SCSI terminal as an external interface in accordance with the Small Computer System Interface specification abbreviated as SCSI, a gate array for controlling the SCSI terminal, etc.

The group of expansion boards 600 is a group of boards connected to the sub image processing board 500 via an interface and is constituted by a printer board 601, an feature expansion board 602 and a facsimile board 603. The printer board 601 enables the digital complex machine 30 to operate as a printer. Specifically, the printer board 601 has a function of controlling the laser recording section 32 such that it outputs image data transmitted thereto from an external apparatus such as a personal computer. The feature expansion board 602 is provided to expand an editing function of the digital complex machine 30, thereby effectively utilizing the feature of the same. The facsimile board 603 has a function of transmitting image data generated by the CCD board 300 to the outside via facsimile communication and controlling the laser recording section 32 to output image data received via facsimile communication.

A description will now be made on image data processing in the facsimile mode in which the digital complex machine 30 operates as a facsimile apparatus. The facsimile mode includes two modes, i.e., a transmission mode and a reception mode. First, the transmission mode will be described. In the transmission mode, image data of a document read by the scanner 31 are transmitted to an external destination via facsimile communication. In this mode, a user sets documents in a predetermined position of the RADF 36. They are fed on to the document table 35 one after another by the RADF 36. The scanner unit 40 and CCD board 300 read an image of each document, generate 8-bit image data and transfer the same to the main image processing board 400.

The multivalue image processing section 402 of the main image processing board 400 carries out predetermined multivalue images processes such as gamma correction on the 8-bit image data and transfers the same to the sub image processing board 500 via connectors 405 and 505. The multivalue-to-binary-value converting section of the binary value image processing section 501 of the sub image processing board 500 carries out an error diffusing process on the 8-bit image data and thereafter converts the same into 2-bit image data. The image data which have been subjected to the binarizing process are compressed into a predetermined format and are stored in the memory section 502.

The multivalue-to-binary-value converting section carries out the error diffusing process because problems associated with image quality can arise in the case where only multi-value-binary-value diffusion is carried out, and this is a measure to suppress deterioration of image quality. The purpose of converting the 8-bit image data into 2-bit data is to reduce the volume of the image data. After a communication line to a destination is established by the facsimile board 603, the image data are read from the memory section 502 and are transferred to the facsimile board 603. At the facsimile board 603, the data are subjected to required processes including change of the format for compression format and are sequentially transmitted to the destination.

The reception mode will now be described. The reception mode is a mode for outputting image data transmitted from an external party in communication using the laser recording section 32, and there are two types of modes, i.e., a normal reception mode and a memory reception mode.

In the normal reception mode, when there is an incoming transmission of image data compressed in a predetermined format via a communication line, the facsimile board 603 transfers the image data to the sub image processing board 500. The sub image processing board 500 receives the image data via the fax interface provided at the binary value image processing section 501, decompresses the image data at the compression/decompression process section to reproduce the same as image data for each page and thereafter transfers the same to the main image processing board 400. The data are subjected to gamma correction at the main image processing board 400 and are thereafter transferred to the LSU 46 of the laser recording section 32 via the laser controller 404. Thus, the laser recording section 32 can output image data with tones based on image data received from the outside via facsimile communication.

The memory reception function will now be described. The memory reception mode is a mode in which the main CPU 401 performs a function of storing reception data transmitted from the sub image processing board 500 in the memory 403 for a predetermined period instead of outputting the same immediately. In the embodiment of the invention, when a predetermined time for printing comes, the main CPU 401 can transfer all of reception data in the memory 403 to the laser recording section 32 to output them at a time. That is, the memory reception mode is preferably used to start output in occasions when the user is absent such as nights and vacations.

Figure 4:
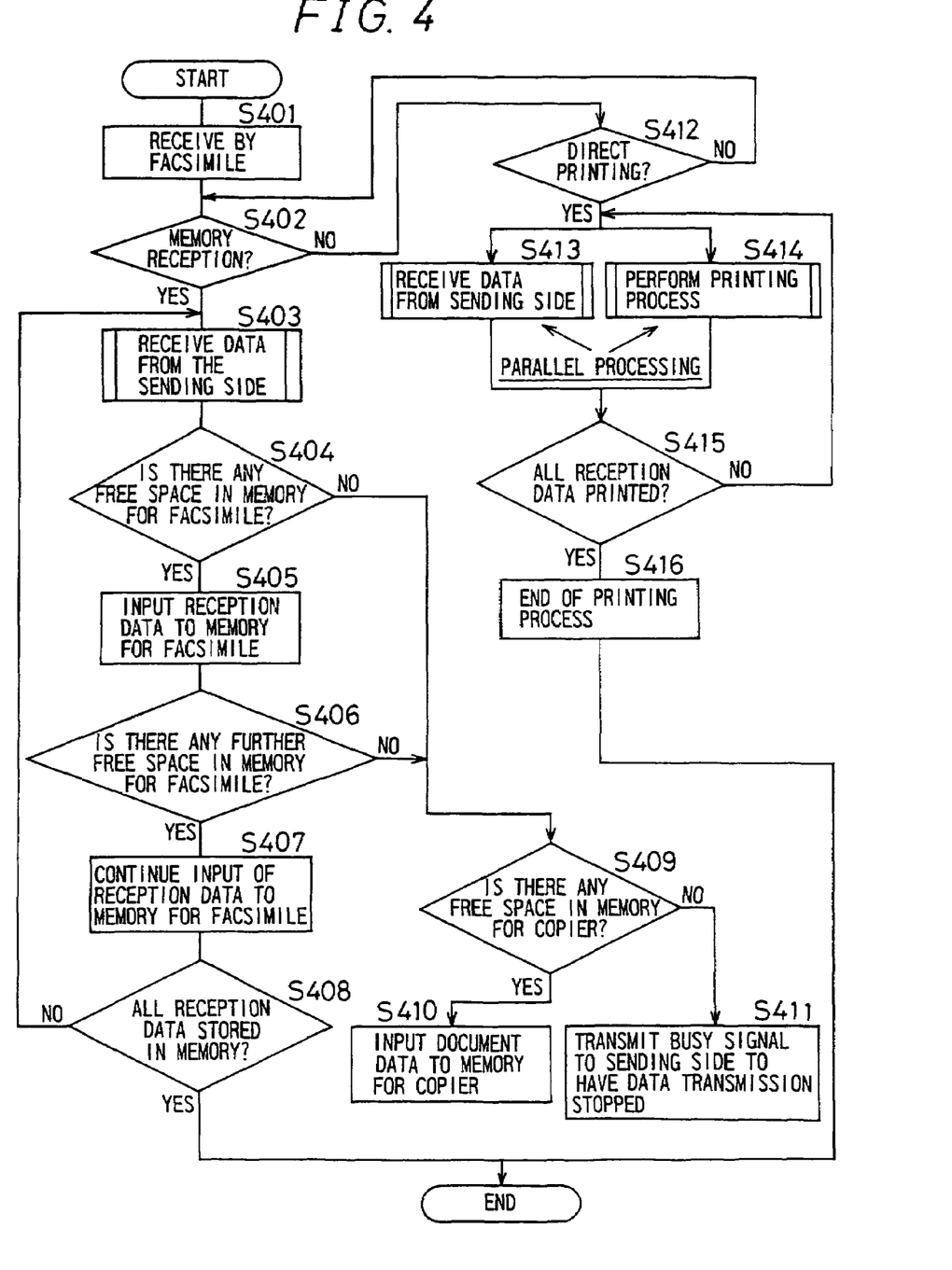
FIG. 4 is a flow chart showing steps of operation in the case where a principle for using memories in combination according to the related art is applied to the complex image processing apparatus in FIG. 1.
Figure 5:
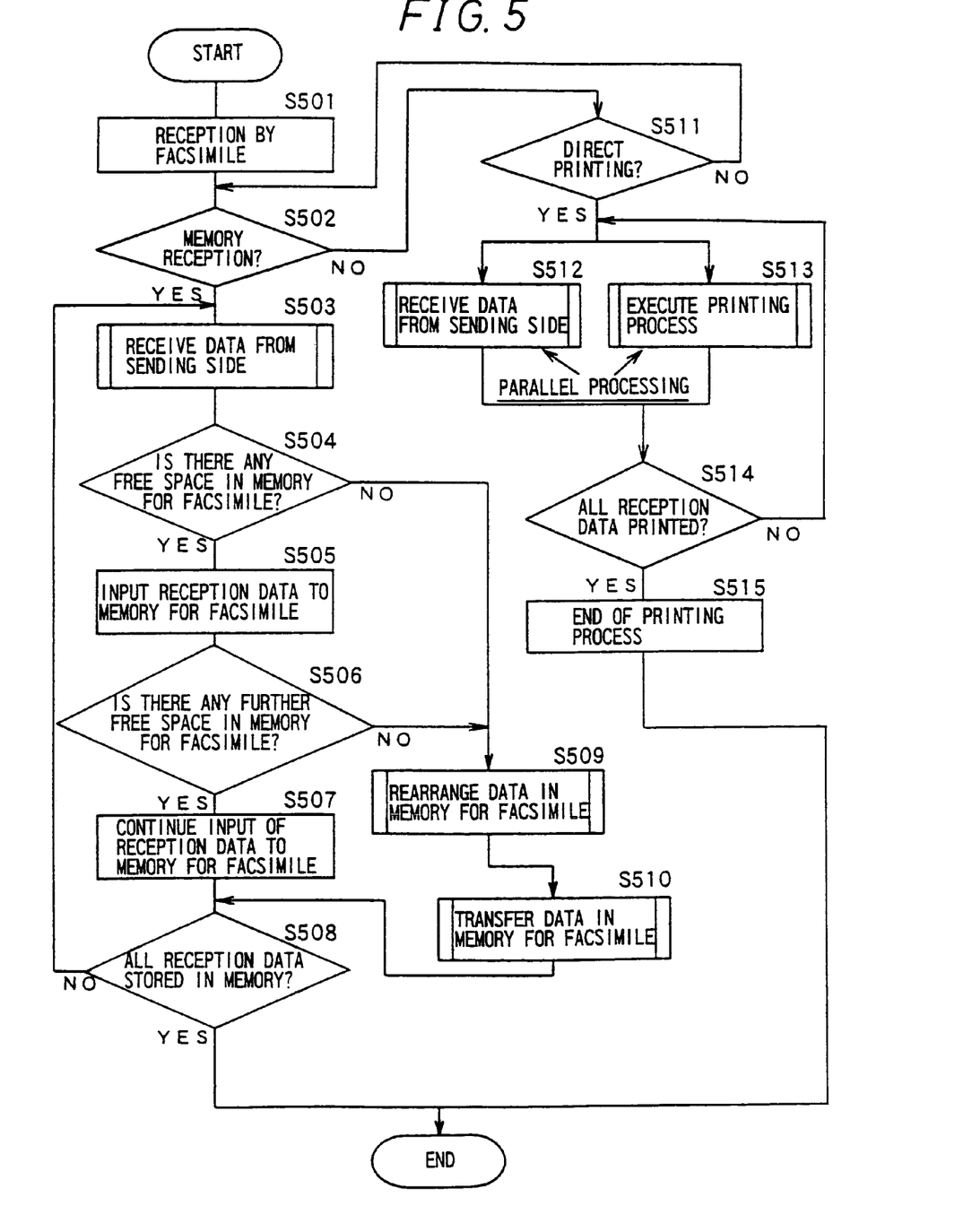
FIG. 5 is a flow chart showing steps for using memories in combination according to the invention in the complex image processing apparatus in FIG. 1.

FIGS. 4 and 5 show a method for using the memory for facsimile 7, memory for copier 6 and memory for printer 10 in combination during memory reception in the facsimile mode. FIG. 4 shows a method for using the memories in combination utilizing a conventional art and operations thereof are as follows. When facsimile data as a result of facsimile communication is received at step S401, it is determined at step S402 whether the memory reception function is selected or not and, if it is selected, a reception process is started at step S403. It is determined at step S404 whether there is a free space in the memory for facsimile 7 and, in the case where there is a free space, the reception data are continuously accumulated in the memory for facsimile 7 at step S405. It is determined again at step S406 whether there is a free space in the memory for facsimile 7 and, in the case where there is a free space, the received facsimile data is continuously accumulated in the memory for facsimile 7 at step S407. The process returns to step S403 to repeat the above-described operations until it is determined at step S408 that all data have been received. In the case where it is determined at step S404 or S406 that there is no free space in the memory for facsimile 7, it is determined at step S409 whether there is a free space in the memory for copier 6 and, in the case where there is a free space, the received facsimile data is accumulated in the memory for copier 6 at step S410. In the case where it is determined at step S409 that there is no free space in the memory for copier 6, a busy signal is output to the sending side to have the output stopped temporarily at step S411.

In the case where it is determined at step S402 that the memory reception function is not selected, it is determined at step S412 whether the direct reception function is selected or not. In the case where the direct reception function is not selected, the process returns to step S402 and, in the case where it is selected, a reception process at step S413 and a printing process at S414 are started in parallel. It is determined at step S415 whether all of the received facsimile data has been printed or not and, in the case where not all of the data have been printed, the process returns to steps S413 and S415. Then, in the case where it is determined that all of the data have been printed, the process proceeds to step S416 to terminate the printing process, which is the end of the entire operation.

While such control allows the memory for facsimile 7 and memory for copier 6 to be used in combination, it has not relation with facsimile data received using memory reception function accumulated in the memory for copier 6, and it is unknown which item of facsimile data is required. In addition, problems such as difficulty in a sorting operation that follows printing can occur because facsimile data are read from each of the memories during printing. In the embodiment of the invention, control as shown in FIG. 5 is carried out to solve such problems.

When facsimile data is received at step S501 in FIG. 5, it is determined at step S502 whether the memory reception function is selected or not. In the case where it is selected, a reception process is started at step S503. It is determined at step S504 whether there is a free space in the memory for facsimile 7 and, in the case where there is a free space, the reception facsimile data are continuously accumulated in the memory for facsimile 7 at step S505. It is determined again at step S506 whether there is a free space in the memory for facsimile 7 and, in the case where there is a free space, the received facsimile data are continuously accumulated in the memory for facsimile 7 at step S507. The process returns to step S503 to repeat the operation of accumulating the facsimile data in the memory for facsimile 7 until it is determined at step S508 that all facsimile data have been received. In the case where it is determined at step S504 or S506 that there is no free space in the memory for facsimile 7, the data in the memory for facsimile 7 are rearranged at step S509, and the data are transferred to a memory for another function at step S510.

In the case where it is determined at step S502 that the memory reception function is not selected, it is determined at step S511 whether the direct reception function is selected or not and, in the case where it is not selected, the process returns to step S502. In the case where it is determined at step S511 that the direct reception function is selected, a reception process at step S512 and a printing process at S513 are started in parallel. It is determined at step S514 whether all of the received facsimile data has been printed or not and, in the case where not all of the data have been printed, the process returns to steps S512 and S513. Then, in the case where it is determined at step S514 that all of the facsimile data have been printed, the process proceeds to step S515 to terminate the printing process, which is the end of the entire operation. Thus, by rearranging and transferring the data at a certain point in time, the memories can be used in combination, and the reception of facsimile data can be carried out only by the memory for facsimile 7.

Figure 6:
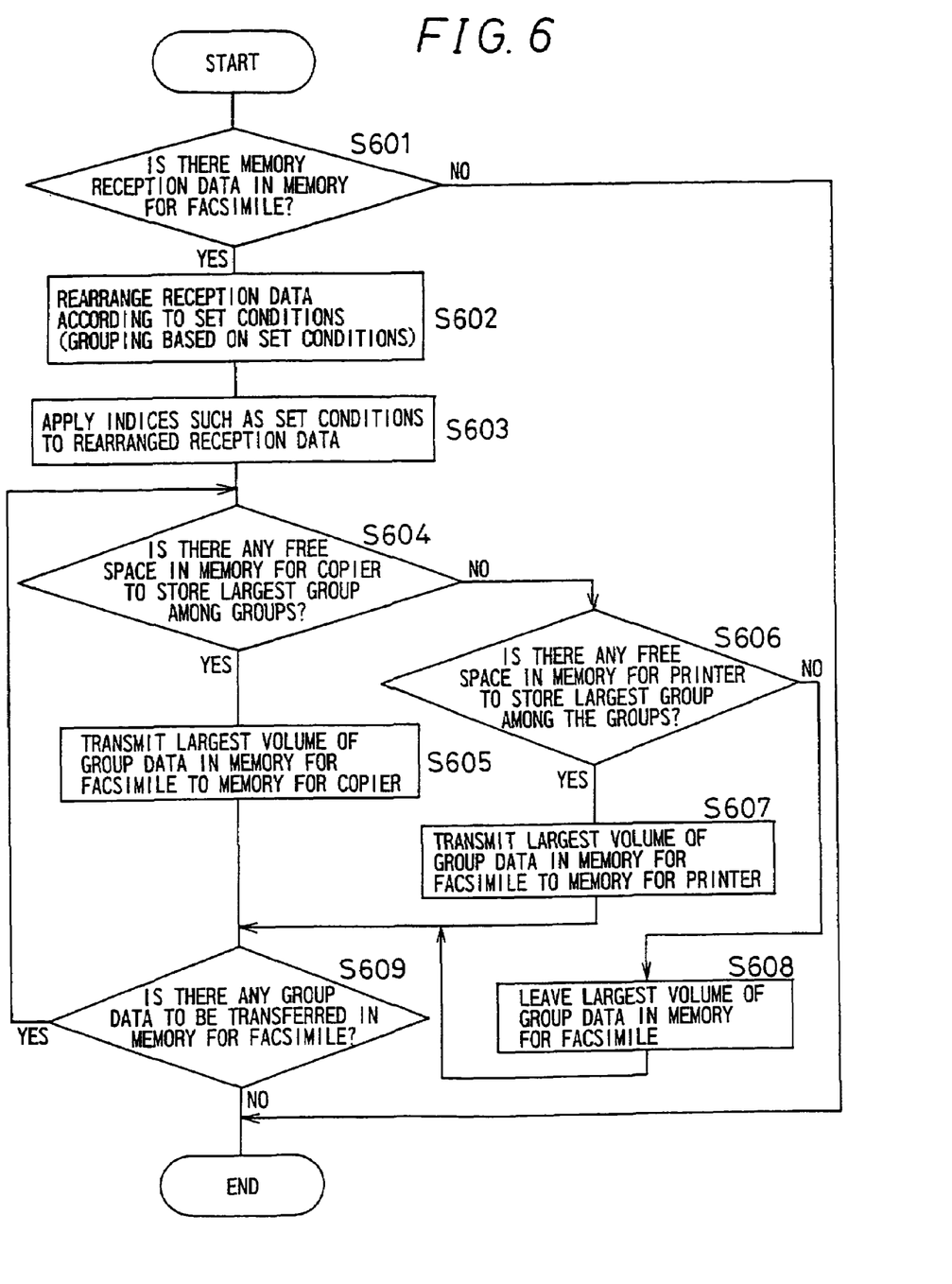
FIG. 6 is a flow chart showing steps of a process of rearranging data in a memory for facsimile 7 at step S509 in FIG. 5 and a process of transferring data in the memory for facsimile 7 at step S510.

FIG. 6 specifically shows the process of rearranging the data in the memory for facsimile 7 at step S509 in FIG. 5 and the process of transferring the data in the memory for facsimile 7 at step S510. At step S601, it is determined whether there is received facsimile data in the facsimile memory 7 or not, and the rearranging and transfer processes are not carried out. In the case where it is determined at step S601 that there is reception data in the memory for facsimile 7, the data in the memory for facsimile 7 are grouped in accordance with set conditions at step S602. At step S603, an index indicating a group name which represents the set conditions is applied to the first or last page of each item of data.

Then, the data transfer process is entered. It is determined at step S604 whether one selected group can be stored in the memory for copier 6 or the like. In the case where it is determined that it can be stored, the one group of reception data is transferred to the memory for copier 6 from the memory for facsimile 7 at step S605. In the case where it is determined at step S606 that the data can not be stored in the memory for printer 10, a process of leaving the selected group in the memory for facsimile 7 is carried out at step S608. The process returns to step S604 to repeat the procedures at the steps up to step S609 until it is determined at step S609 that memory for facsimile 7 has no further data to be transferred to a memory for another function.

Such grouping and application of indices makes it possible to distinguish the divisions of one item of data during transfer of data to a memory for another function and to thereby establish association between items of data which has been a problem in conventional methods. Further, an operation of sorting data can be easily carried out after printing. The conditions for rearrangement of data as described above can be set using various methods such as use of the order of the telephone numbers of the senders of reception data and arrangement in the order of priorities given to senders.

Further, referring to specific conditions for the determination at the steps S504 and S506 to start rearrangement of data in the memory for facsimile 7, a user may make a setting to carry out the rearrangement each time a predetermined time has passed after the beginning of the memory reception function or to carry out the same when the total memory capacity of the memory for facsimile 7 exceeds a predetermined capacity. When the method in which data are rearranged each time a predetermined time passes is used, the predetermined time may elapse during the reception of data into the memory. In this case, the data rearranging and transfer processes are to be carried out when the reception of facsimile data using the memory reception function in progress at that point in time is completed. In general, there is some time between reception of one facsimile communication and reception of the next facsimile communication, and the data rearranging and transfer processes can be carried out in the same period. In the case where the next facsimile data is received before the data rearranging and transfer processes are completed, one possible solution is to transmit a busy signal to the sending side to have the transmission of the facsimile data held.

Referring to a method for setting a predetermined capacity as a capacity to be left in the memory for facsimile 7, the maximum capacity which has been used for reception using the memory reception function since the installation of the digital complex machine 30 as a facsimile apparatus until the present time may be set, which allows reliable facsimile reception of data whose volume does not exceed the largest volume of the past reception. There are various alternative methods for setting such as setting a constant unchanged volume as the predetermined volume. Referring to the order for determination of items of data transferred from the memory for facsimile 7 to a memory for another function, the determination may be carried out for each group after rearrangement and may be carried out sequentially starting with a large volume of group data which occupies a high ratio of the memory capacity.

Figure 7:
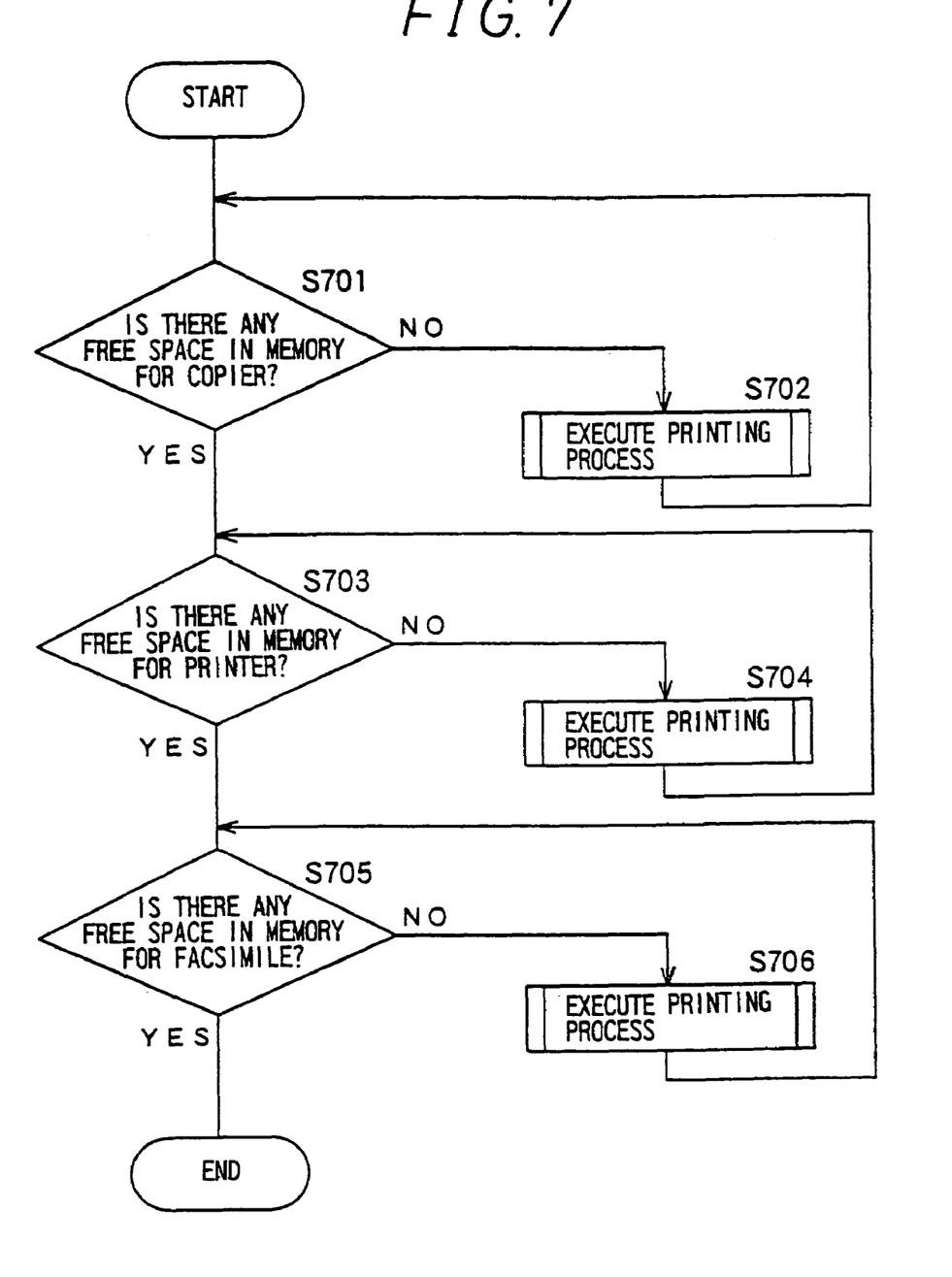
FIG. 7 is a flow chart showing steps of a process of printing facsimile data accumulated in a memory for each function of the complex image processing apparatus in FIG. 1 so that facsimile data in the memory for facsimile 7 is printed lastly.
Figure 8:
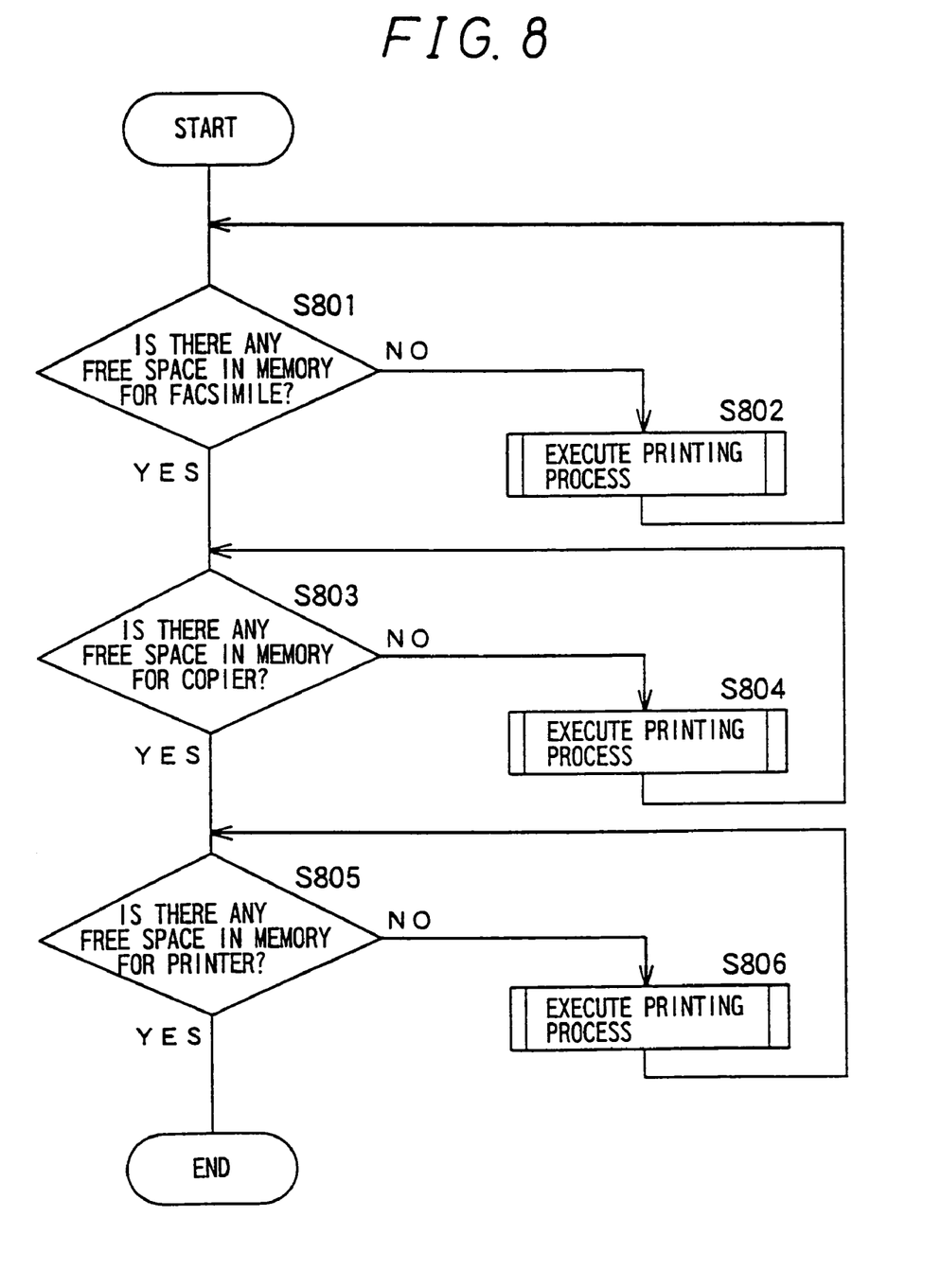
FIG. 8 is a flow chart showing steps of a process of printing facsimile data accumulated in the memory for each function of the complex image processing apparatus in FIG. 1 in which facsimile data accumulated in the memory for facsimile 7 precedes in printing.
Figure 9:
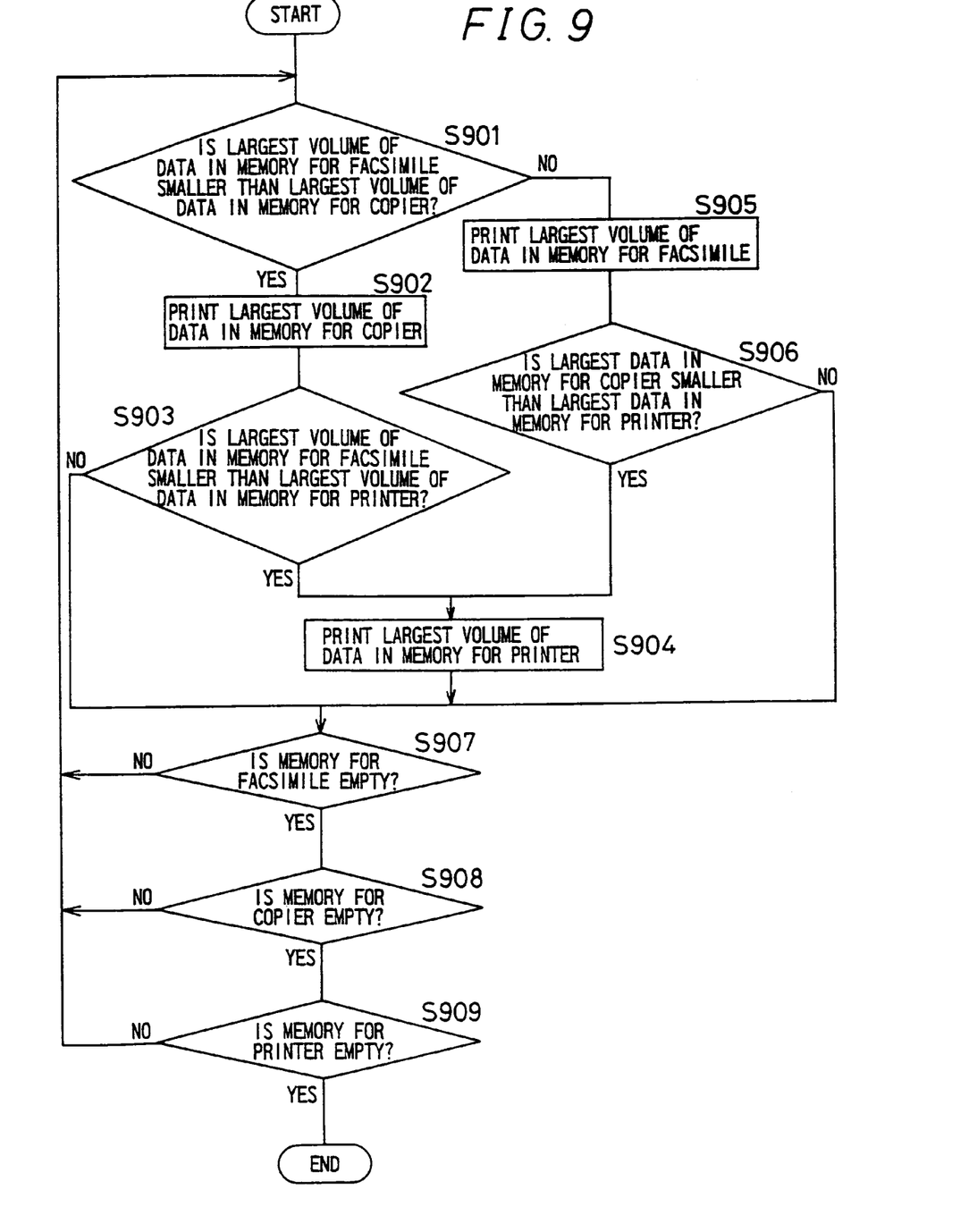
FIG. 9 is a flow chart showing steps of a process of printing facsimile data accumulated in the memory for each function of the complex image processing apparatus in FIG. 1 in the order of decreasing capacities.

FIGS. 7, 8 and 9 show steps for printing facsimile data distributed to and saved in memories for various functions as a result of transfer of data as described in FIG. 6. FIG. 7 shows specific processing steps for printing data in the memory for facsimile 7 lastly. Until it is determined at step S701 that the memory for copier 6 has become empty, facsimile data in the memory for copier 6 are printed at step S702. Next, until it is determined at step S703 that the memory for printer 10 has no further facsimile data, a process of printing facsimile data in the memory for printer 10 is carried out at step S704. Finally, until it is determined at step S705 that the memory for facsimile 7 has no further facsimile data, a process of printing facsimile data in the memory for facsimile 7 is carried out at step S706. Such a process makes it possible to release the memories other than the memory for the facsimile mode quickly, thereby allowing functions in other modes to be effectively performed. While the memory for copier 6 is first checked at step S701 to release the memory for copier 6 prior to the memory for printer 10, the memory for printer 10 may be checked at step S701 in the case where it is desirable to release the memory for printer 10 first.

FIG. 8 shows specific processing steps for printing data in the memory for facsimile 7 first. Until it is determined at step S801 that the memory for facsimile 7 has become empty, facsimile data in the memory for facsimile 7 are printed at step S802. Next, until it is determined at step S803 that the memory for copier 6 has no further data, data in the memory for copier 6 are printed at step S804. Finally, until it is determined at step S805 that the memory for printer 10 has no further data, data in the memory for printer 10 are printed at step S806. Such a process makes it possible to release the memory for facsimile 7 quickly, thereby allowing the memory reception function in the facsimile mode to be quickly and effectively recovered. While the memory for copier 6 is first checked at step S803 to release the memory for copier 6 prior to the memory for printer 10, the vacancy of the memory for printer 10 may be checked at step S803 in the case where it is desirable to release the memory for printer 10 first.

FIG. 9 shows specific processing steps for printing sets of facsimile data in the memories for various functions sequentially in the order of decreasing volumes while checking the largest volume of the sets of facsimile data. First, at step S901, the largest volume of data in the memory for facsimile 7 is compared with the largest volume of data in the memory for copier 6, and in the case where the largest volume of data in the memory for copier 6 is larger, the largest volume of data in the memory for copier 6 is printed at step S902. Next, at step S903, the largest volume of data in the memory for facsimile 7 is compared with the maximum volume of data in the memory for printer 10. In the case where the largest volume of data in the memory for printer 10 is larger, the largest volume of data in the memory for printer 10 is printed at step S904. In the case where it is determined at step S901 that the largest volume of data in the memory for facsimile 7 is larger, the largest volume of data in the memory for facsimile 7 is printed at step S905. Next, at step S906, the largest volume of data in the memory for copier 6 is compared with the largest volume of data in the memory for printer 10 and, in the case where the largest volume of data in the memory for printer 10 is larger, the largest volume of data in the memory for printer 10 is printed at step S904. In the case where the largest volume of data in the memory for printer 10 is smaller at steps S903 and S906, it is determined at step S907 whether the memory for facsimile 7 has become empty. The process returns to step S901 to repeat the above-described operations until it is determined that the memory for facsimile 7 is empty. Then, it is determined at step S908 whether the memory for copier 6 has become empty, and the process returns to step S901 to repeat the above-described operations until it is determined that the memory for copier 6 is empty. Finally, it is determined at step S909 whether the memory for printer 10 has become empty, and the process returns to step S901 to repeat the above-described operations until it is determined that the memory for printer 10 is empty. Thus, the maximum capacities in the memories for various functions are compared with each other, and printing is sequentially carried out starting with the largest volume of data, which makes it possible to enable the memories for various functions evenly without any imbalance.

While the above-described digital complex machine 30 of the embodiment of the invention has functions of a facsimile apparatus, a copier and a printer, it may also be caused to function as a scanner for fetching image data into the personal computer 11 or the like using the scanner unit 40. Those functions are enabled for concurrent operations, and settings are possible including a setting in which when the operation of any of the functions has already been started, the other functions wait for the termination of the operation and a setting in which top priority is given, for example, to the facsimile mode to enable reception of facsimile data by interrupting the operation of the apparatus, for example, as a printer when facsimile communication is received during the use of the apparatus as a printer.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

The invention claimed is:

1. A complex image processing apparatus capable of operating as a facsimile apparatus, comprising;
    image reading means for reading image information of a document;
    image communicating means for transmitting the image information read by the image reading means and receiving image information;
    image forming means for recording the image information received by the image communicating means on a recording medium;
    mode switching means for carrying out switching among facsimile mode and others modes each involving recording image information on a recording medium,
    the complex image processing apparatus being used in the facsimile mode, as a facsimile apparatus in which a memory reception function can be specified, and in the other modes, as other kinds of apparatuses;
    a memory for facsimile available for receiving facsimile data in the facsimile mode;
    a memory for other modes available in the other modes; and
    memory control means for performing control in the facsimile mode such that image information previously received and stored in the memory for facsimile is rearranged in order that at least part of the image information previously received and stored in the memory for facsimile is transferred to either or both of the memories for the other modes in the case where predetermined conditions are satisfied, only after the at least part of the image information was first received and stored in the memory for facsimile, and facsimile data continues to be received by the memory for facsimile.

2. The complex image processing apparatus of claim 1, wherein
    the predetermined conditions are that the memory reception function is specified in the facsimile mode and a remaining capacity of the memory for facsimile after beginning of memory reception, available in the memory reception function, comes to a predetermined capacity.

3. The complex image processing apparatus of claim 2, wherein the predetermined capacity is set to a capacity for use in storing a largest volume of image information among per communication reception volumes of image information in a reception history of the facsimile mode.

4. The complex image processing apparatus of claim 1, wherein the memory control means performs control such that image information transferred to the memories for the other modes is rearranged according to predetermined criteria.

5. The complex image processing apparatus of claim 1, wherein the memory control means makes a data format of image information transferred to the memories for the other modes, identical to a data format of image information stored in the memory for facsimile.

6. The complex image processing apparatus of claim 1, wherein in the case where received image information is stored in the memory for facsimile and in either or both of the memories for the other modes, the memory control means performs control such that the image forming means records image information stored in the memories for the other modes, on a recording medium prior to recording the image information stored in the memory for facsimile on a recording medium.

7. The complex image processing apparatus of claim 1, wherein in the case where received image information is stored in the memory for facsimile and in either or both of the memories for the other modes, the memory control means performs control such that the image forming means records image information stored in the memory for facsimile on a recording medium, prior to recording the image information stored in the memories for the other modes on a recording medium.

8. The complex image processing apparatus of claim 1, wherein the complex image processing apparatus is a stand-alone complex image processing apparatus.

9. A complex image processing apparatus capable of operating as a facsimile apparatus, comprising:
- image reading means for reading image information of a document;
- image communicating means for transmitting the image information read by the image reading means and receiving image information;
- image forming means for recording the image information received by the image communicating means on a recording medium;
- mode switching means for carrying out switching among facsimile mode and others modes each involving recording image information on a recording medium,
- the complex image processing apparatus being used in the facsimile mode, as a facsimile apparatus in which a memory reception function can be specified, and in the other modes, as other kinds of apparatuses;
- a memory for facsimile available only in the facsimile mode;
- a memory for other modes available in the other modes; and
- memory control means for performing control in the facsimile mode such that image information stored in the memory for facsimile is transferred to either or both of the memories for the other modes in the case where predetermined conditions are satisfied,
- wherein the predetermined conditions are that the memory reception function is specified in the facsimile mode and a predetermined time has passed after beginning of memory reception.

10. A complex image processing apparatus capable of operating as a facsimile apparatus, comprising:
- image reading means for reading image information of a document;
- image communicating means for transmitting the image information read by the image reading means and receiving image information;
- image forming means for recording the image information received by the image communicating means on a recording medium;
- mode switching means for carrying out switching among facsimile mode and others modes each involving recording image information on a recording medium,
- the complex image processing apparatus being used in the facsimile mode, as a facsimile apparatus in which a memory reception function can be specified, and in the other modes, as other kinds of apparatuses;
- a memory for facsimile available only in the facsimile mode;
- a memory for other modes available in the other modes; and
- memory control means for performing control in the facsimile mode such that image information stored in the memory for facsimile is transferred to either or both of the memories for the other modes in the case where predetermined conditions are satisfied,
- wherein the memory control means performs control such that image information transferred to the memories for the other modes is rearranged according to predetermined criteria, and
- the memory control means performs control such that the rearranged image information is sequentially transferred in the order of decreasing data sizes insofar as the rearranged image information can be stored in the memories for the other modes.

11. A complex image processing apparatus capable of operating as a facsimile apparatus, comprising:
- image reading means for reading image information of a document;
- image communicating means for transmitting the image information read by the image reading means and receiving image information;
- image forming means for recording the image information received by the image communicating means on a recording medium;
- mode switching means for carrying out switching among facsimile mode and others modes each involving recording image information on a recording medium,
- the complex image processing apparatus being used in the facsimile mode, as a facsimile apparatus in which a memory reception function can be specified, and in the other modes, as other kinds of apparatuses;
- a memory for facsimile available only in the facsimile mode;
- a memory for other modes available in the other modes; and
- memory control means for performing control in the facsimile mode such that image information stored in the memory for facsimile is transferred to either or both of the memories for the other modes in the case where predetermined conditions are satisfied,
- wherein in the case where received image information is stored in the memory for facsimile and in either or both of the memories for the other modes, the memory control means performs control such that the image forming means records the image information on a recording medium in the order of decreasing data sizes starting with a piece of image information having a largest data size.

* * * * *